United States Patent [19]

Matsuda

[11] Patent Number: 4,531,198
[45] Date of Patent: Jul. 23, 1985

[54] OPERATION MODE MONITOR FOR MICROCOMPUTER

[75] Inventor: Toshiro Matsuda, Zama, Japan

[73] Assignee: Nissan Motor Company, Limited, Yokohama, Japan

[21] Appl. No.: 482,564

[22] Filed: Apr. 6, 1983

[30] Foreign Application Priority Data

May 19, 1982 [JP]  Japan ................... 57-83231

[51] Int. Cl.³ ............................................ G06F 11/30
[52] U.S. Cl. ............................................... 364/900
[58] Field of Search ... 364/200 MS File, 900 MS File; 371/16

[56] References Cited

U.S. PATENT DOCUMENTS

| | | | |
|---|---|---|---|
| 4,156,929 | 5/1979 | Eichenlaub et al. | 364/900 |
| 4,241,416 | 12/1980 | Tarczy-Hornoch | 364/900 |
| 4,363,092 | 12/1982 | Abo et al. | 364/200 |

FOREIGN PATENT DOCUMENTS 2943133  4/1980  Fed. Rep. of Germany .

Primary Examiner—Raulfe B. Zache
Attorney, Agent, or Firm—Schwartz, Jeffery, Schwaab, Mack, Blumenthal & Evans

[57] ABSTRACT

An operation mode monitor for a microcomputer in which any one of a plurality of operation modes can be selected in response to an operation mode setting signal generated from an external circuit when reset. The monitor according to the present invention can check whether a predetermined correct operation mode has been selected in the microcomputer in accordance with a checking program and output an abnormal-operation-mode command signal in case of erroneous selection due to noise. In response to this signal, an alarm lamp is lit up; the microcomputer is automatically reset repeatedly until a correct operation mode is selected; and/or an actuator controlled by the microcomputer is automatically disabled.

19 Claims, 9 Drawing Figures

OPERATION MODE MONITOR FOR MICROCOMPUTER

BACKGROUND OF THE INVENTION

1. Field of the Invention

The present invention relates generally to an operation mode monitor for a microcomputer, and more specifically to a monitor for checking whether or not a predetermined operation mode has correctly been selected in a microcomputer in response to an operation mode setting signal generated from an external circuit whenever the microcomputer is initialized.

2. Description of the Prior Art

Recently, a microcomputer is widely used for an automotive vehicle to electronically control an engine, an air conditioner, etc. The microcomputer encapsuled within a chip is usually provided with a microprocessing unit (MPU) for executing various calculations or operations in accordance with control programs, a random-access memory (RAM) for temporarily storing various data, a read-only memory (ROM) for storing the control programs, and input and output ports. A predetermined program control for an automotive vehicle can be implemented by connecting various sensors and actuators to the input/output ports of the microcomputer.

However, the memory capacity of the ROM housed within a microcomputer chip is usually as small as 2K bite or byte (one bite means a group of binary digits considered as one unit or one word). Therefore, this memory capacity is not sufficient for a certain control program. In order to increase the memory capacity, some ROMs are externally connected to the microcomputer. In this case, operation mode in which only the internally-housed ROM is used is called single-chip mode; operation mode in which externally-connected ROMs are used is called extended mode. To use such a microcomputer, the user must previously select any one of a plurality operation modes and the selected operation mode is initially set in the microcomputer, whenever the microcomputer is initialized, in response to a mode setting signal generated from an external circuit.

To give an example of such a microcomputer in which operation modes can previously be selected, there exists a microcomputer of HITACHI HD 6801. In this model, one of three operation modes of single chip mode, extended non-multiplex mode and extended multiplex mode can be selected by inputting a predetermined external signal corresponding thereto through three specific input port terminals.

However, in the case where such a microcomputer as described above is mounted on an automotive vehicle body, since the operation mode setting signal is susceptible to intense noise generated thereabouts, there exists a problem in that an erroneous operation mode different from the one corresponding to the predetermined operation mode setting signal may be selected. In case an erroneous operation mode has been selected in the microcomputer, since sensors or actuators are all arranged for the microcomputer so as to operate correctly only when a predetermined single operation mode has correctly been selected, it is impossible to execute normal calculations, operations or control.

In this connection, in case such an erroneous operation mode has been selected, although it is possible to select a correct operation mode readily by resetting the microcomputer again, since it is relatively difficult for the user to know that the microcomputer is set to an abnormal operation mode, there exists another problem in that the user cannot take an appropriate action promptly.

A more detailed description of the prior-art microcomputer in which any one of operation modes can be selected will be made with reference to the attached drawings under DETAILED DESCRIPTION OF THE PREFERRED EMBODIMENTS.

SUMMARY OF THE INVENTION

With these problems in mind, therefore, it is the primary object of the present invention to provide an operation monitor for a microcomputer in which a predetermined operation mode can be selected from among a plurality of operation modes in response to an operation-mode setting signal generated from an external circuit whenever the microcomputer is initialized. The monitor according to the present invention can check whether or not a predetermined correct operation mode has been selected in the microcomputer in accordance with a checking program and output an abnormal-operation-mode command signal, in case of an erroneous operation mode selection due to noise, in order to automatically light-up an alarm lamp, reset the mirocomputer repeatedly until a correct operation mode can be selected, and/or disable an actuator controlled by the microcomputer.

To achieve the above-mentioned object, the operation mode monitor for a microcomputer according to the present invention comprises an operation mode checking program stored in the microcomputer for comparing the operation mode setting signal inputted from an external circuit to the microcomputer with reference signal previously stored in the microcomputer and outputting an abnormal-operation-mode command signal in case of an erroneous operation mode selection, and abnormal-operation-mode correcting means for correcting an erroneously-selected operation mode to a correct operation mode in response to the abnormal-operation-mode command signal.

The above-mentioned correcting means is a circuit to light-up an alarm lamp, a circuit to reset the microcomputer, and/or a circuit to disable an actuator connected to the microcomputer.

BRIEF DESCRIPTION OF THE DRAWINGS

The features and advantages of the operation mode monitor for a microcomputer according to the present invention will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present invention, a brief reference will be made to a prior-art micrcomputer in which a predetermined operation mode can be selected from among a plurality of operation modes in response to an operation mode setting signal inputted thereto from an external circuit, with reference to the attached drawing.

Figure 1:
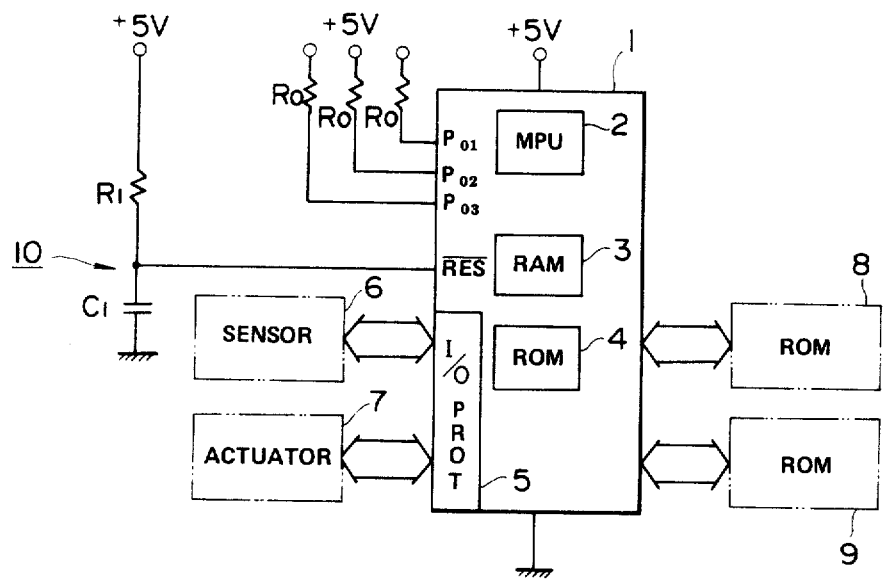
FIG. 1 is a schematic block diagram of a prior-art microcomputer in which a predetermined operation mode can be selected from among a plurality of operation modes in response to an operation mode setting signal inputted thereto from an external circuit.

As shown in FIG. 1, a microcomputer 1 encapsuled within a chip comprises a microprocessing unit (MPU)2 for executing various calculations or operations in accordance with control programs, a random-access memory (RAM)3 for temporarily storing various data, a read-only memory (ROM)4 for storing the control programs, and input/output ports 5. A predetermined program control can be implemented by connecting various sensors 6 and actuators 7 to the input/output ports 5. However, the memory capacity of the ROM 4 housed within a microcomputer chip is not usually sufficient, for instance, as small as 2K byte. Therefore, in order to increase the memory capacity, some ROMs are externally connected to the microcomputer 1.

For instance, in the case of a HITACHI's microcomputer Model No. HD 6801, two additional ROMs 8 and 9 are externally connected thereto and therefore three operation modes are selectively usable according to the purpose of the user. In this model, when only the ROM 4 housed within the microcomputer 1 is used, this operation mode is called single chip operation mode; when the externally-connected ROM 8 is directly connected to the MPU 2, this operation mode is called extended non-multiplex mode; when the externally-connected ROM 9 is connected to the MPU 2 via a multiplexor, this operation mode is called extended multiplex mode.

In order to use only an appropriate operation mode from among the above-mentioned three modes, it is necessary to input a predetermined three-bit mode setting signal from an external circuit to the microcomputer through three specified port terminals $P_{01}$, $P_{02}$, and $P_{03}$. For instance, in the case where the single chip mode is required to select, it is necessary to apply three high-voltage level signals of 5 volts to the port terminals $P_{01}$, $P_{02}$, and $P_{03}$ via three resistors $R_o$. In FIG. 1, the single chip mode can be selected as follows: when a power supply for the microcomputer 1 is turned on, the voltage of the capacitor $C_1$ in a reset circuit 10 rises gradually in accordance with a time constant curve determined by the resistance $R_1$ and the capacitance $C_1$, with the result that a voltage of 5 volt is applied to the inversion reset terminal $\overline{RES}$ to initialize the microcomputer 1 a predetermined time period after the power supply has been turned on. This is because the microcomputer can be reset after the power supply voltage has become stable. Further, the inversion reset terminal $\overline{RES}$ indicates that the microcomputer is reset in response a negative signal obtained by inverting the power supply voltage.

The instant the microcomputer 1 is initialized, the three-bit single-chip-mode setting signal is read from an external circuit to set the microcomputer to the single-chip mode and program control is implemented in accordance with a program stored in the ROM 4 housed within the microcomputer 1. However, in the case there the microcomputer of this type is used for an automotive vehicle, since there exists various electrical noise thereabouts, the operation mode setting signal is often mixed with noise and thereby an erroneous operation mode setting signal different from the predetermined correct one is often read in the microcomputer 1, with the result that another operation mode different from the predetermined mode is often selected. In the case such an erroneous operation mode as described above has been selected, since the sensors 6 and the actuators 7 are all connected so as to operate correctly in accordance with only the programs stored in the ROM 4 housed within the microcomputer 1, erroneous data signals and erroneous address signals develop, causing abnormal calculations and operations, thus it being impossible to implement normal program control.

In view of the above description, reference is now made to a first embodiment of the operation mode monitor for a microcomputer according to the present invention, in which a predetermined operation mode can be checked in accordance with a first operation mode checking program and an erroneous operation mode is indicated by an alarm lamp lit up by a retriggerable monostable multivibrator in response to a fixed voltage level signal outputted from a program run terminal.

In FIG. 1, the reference numeral 1 denotes a microcomputer in which a predetermined operation mode can be selected from among a plurality of modes (e.g. single chip mode, extended non-multiplex mode and extended multiplex mode) in response to an operation mode setting signal inputted thereto from an external circuit through a plurality of port terminals. In this embodiment, three logically high-voltage level signals of 5 volt are inputted to the microcomputer 1 through three port terminals $P_{01}$, $P_{02}$ and $P_{03}$ in order to select the single chip mode.

The reference numeral 10 denotes a reset circuit having a resistor $R_1$ and a capacitor $C_1$. Therefore, when a power supply voltage of 5 volt is applied to the reset circuit 10, the power supply voltage is applied to the inversion reset terminal $\overline{RES}$ thereof (the microcomputer is reset by a negative power supply voltage), in order to initialize the microcomputer 1, after a predetermined time period determined by a time constant obtained by $R_1 \times C_1$; that is, after the power supply voltage becomes stable without fluctuations.

The label PR in the microcomputer 1 designates a program run terminal for outputting a program run signal, the voltage level of which is inverted periodically (periodic time: $t_1$) as far as control programs stored within the microcomputer 1 are executed normally one by one. This progam run signal is outputted from the terminal PR in accordance with the control of a prior-art monitoring program stored within the microcomputer 1. In case there exists a trouble with the control programs, since this program run signal is not inverted periodically, the microcomputer 1 is usually reset by an externally-connected timer (e.g. a watchdog timer) which can detect this abnormal state.

Figure 3:
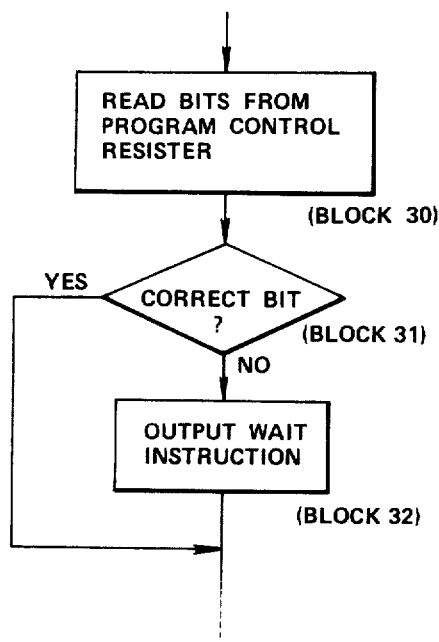
FIG. 3 is a flowchart of the first operation mode checking program stored in the microcomputer shown in FIG. 2, which shows the steps of checking whether or not a correct operation mode has been selected and outputting a WAIT instruction in case of erroneous solution.

In this embodiment, a first operation mode checking program according to the present invention shown in FIG. 3 is additionally stored within the microcomputer 1.

In FIG. 3, the program control first reads an operation mode setting signal previously stored in a program control register through the port terminals $P_{01}$, $P_{02}$, and $P_{03}$, when the microcomputer 1 is reset (in block 30). Next, the read operation mode setting signal is compared with the reference operation mode signal previously stored in the microcomputer 1 on the basis of bits of the two signals (in block 31). If the read bits match the reference bits, the succeeding program control is executed without interruption; but if the read bits do not match the reference bits, since this indicates an erroneous operation mode selection, the control outpouts a WAIT instruction as an abnormal-operation-mode command signal in order to interrupt the succeeding program control and keep the program run signal at a fixed voltage level (in block 32).

The reference numeral 14 denotes a timer circuit of a retriggerable monostable multivibrator connected to the program run terminal PR. As an example of this retriggerable monostable multivibrator, it is possible to give HITACHI HD 14538 B. To two terminals $T_1$ and $T_2$ of this multivibrator 14, a resistor $R_2$ and a capacitor $C_2$ are externally connected to determine a preset time $t_2$ on the basis of the time constant obtained by $C_2 \times R_2$. This preset time $t_2$ is so determined as to be longer than the periodic time $t_1$ of the program run signal outputted from the terminal PR.

In the retriggerable monostable multivibrator 14, the output terminal Q is kept at a H-voltage level when a H-voltage level trigger signal is applied to the inversion terminal $\overline{B}$ via a resistor $R_4$ (i.e. the multivibrator is triggered by a L-voltage level signal) but at a L-voltage level automatically after the preset time $t_2$ has elapsed. Therefore, if the H-voltage level program run trigger signal (the peiodic time $t_1$ is shorter than $t_2$) is periodically applied to the terminal $\overline{B}$ before the preset time $t_2$ has elapsed, the output terminal Q thereof is kept at a H-voltage level continuously; however, if the program run signal is fixed at a constant level without triggering the multivibrator 14, the output terminal Q is kept at a L-voltage level continuously.

Further, the output terminal Q of this monostable multivibrator 14 is connected to the base of a transistor 18 via an inverter 16 and a resistor $R_5$. The reference numeral 20 denotes an alarm lamp connected to the collector of the transistor 18.

In this embodiment, the first operation mode checking program shown in FIG. 3 is operation mode checking means; the retriggerable monostable multivibrator 14, the inverter 16, the transistor 18 and the alarm lamp 20 are abnormal-operation-mode correcting means.

The operation of the first embodiment according to the present invention will be described hereinbelow.

When a power supply for a microcomputer 1 is turned on, the microcomputer 1 is reset or initialized by the reset circuit 10 after a predetermined time period determined by the time constant of $C_1 \times R_1$. When reset, the microcomputer 1 reads an operation mode setting signal corresponding to a desired operation mode, which is generated by an external circuit, into a program control register through the port terminals $P_{01}$, $P_{02}$, and $P_{03}$.

On the other hand, when reset, the microcomputer 1 begins to execute control programs sequentially beginning from the address No. 1 of the control memory and outputs a program run signal inverted periodically with a periodic time $t_1$ from the terminal PR. Additionally, since the first operation mode checking program shown in FIG. 3 is stored in a predetermined address number of the control memory, the three bits of the operation mode setting signal are read from the register and compared with the reference ones. If both the bits match, the control program continues to execute necessary calculations or operations, outputting a program run signal to repeatedly trigger the multivibrator 14 and to keep the output Q thereof at a H-voltage level. Since this output signal is inverted to a L-voltage level signal by the inverter 16, the transistor 18 is kept turned off and therefore the lamp 20 is not lit up.

In contrast with this, in case noise is generated and inputted to the port terinals $P_{01}$, $P_{02}$ and $P_{03}$ when the microcomputer 1 is initialized and thereby the operation mode setting signal changes from the correct one, since both the bits do not match, the first checking program executes an WAIT instruction in block 32 shown in FIG. 3. Once this WAIT instruction is executed, all the terminals of the microcomputer 1 inclusive of the terminal PR are kept at predetermined voltage level. That is to say, the program run signal outputted from the terminal PR is not inverted over the preset time $t_2$ of the retriggerable monostable multivibrator 14, with the result that the output Q of the multivibrator 14 outputs a L-voltage level when the preset time $t_2$ (multivibrator's inversion set period) has elapsed.

In response to this L-voltage level signal, the transistor 18 is turned on to light-up the alarm lamp 20 (after the L signal is inverted into a H-signal via the inverter 16), indicating that an erroneous operation mode has been selected. In such case as described above, it is possible to select a correct operation mode by resetting the microcomputer again; that is, by turning the power supply of the microcomputer once off and next on again.

Figure 4:
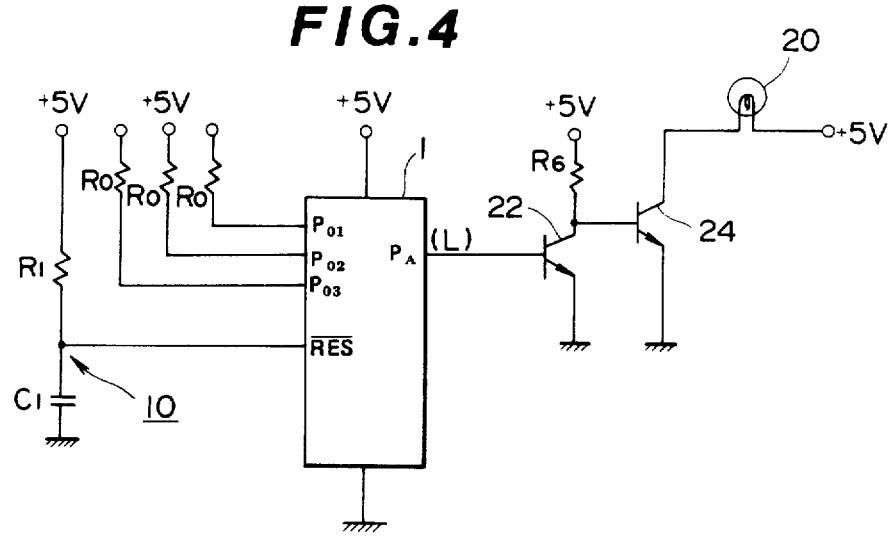
FIG. 4 is a schematic block diagram of a second embodiment of the operation mode monitor for a microcomputer according to the present invention, in which a predetermined operation mode can be checked in accordance with a second operation mode checking program and an alarm lamp comes on in response to a L-voltage level signal in case an erroneous operation mode has been selected.

FIG. 4 shows a second embodiment of the operation mode monitor for a microcomputer according to the present invention, in which a predetermined operation mode can be checked in accordance with a second operation mode checking program and an erroneous operation mode is indicated by an alarm lamp lit up in response to a L-voltage level signal outputted from an abnormal operation mode output terminal.

In FIG. 4, the label $P_A$ in the microcomputer 1 designates an abnormal operation mode output terminal for outputting a L-voltage level signal indicative of an erroneous operation mode selection.

Figure 5:
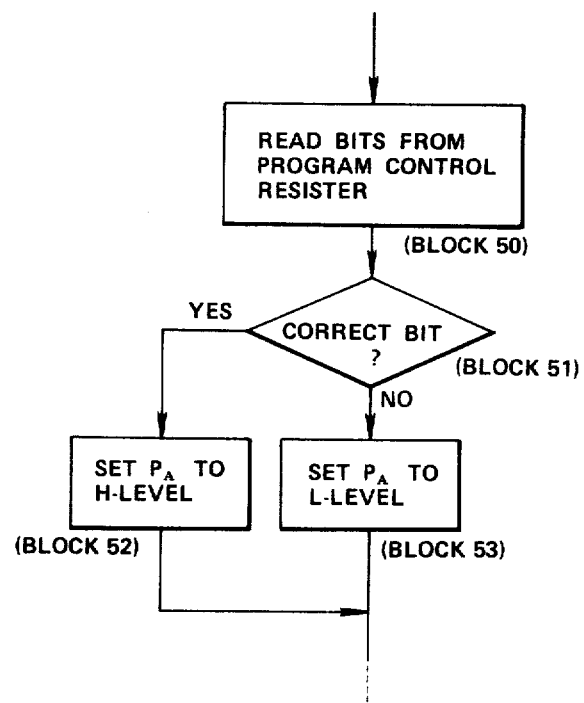
FIG. 5 is a flowchart of the second operation mode checking program stored in the microcomputer shown in FIG. 4, which shows the steps of checking whether or not a correct operation mode has been selected and outputting a L-voltage level signal in case of erroneous selection.

In this embodiment, a second operation mode checking program according to the present invention shown in FIG. 5 is previously stored within the microcomputer 1.

In FIG. 5, the program control first reads an operation mode setting signal previously stored in a program control resister through the port terminals $P_{01}$, $P_{02}$, and $P_{03}$ when the microcomputer 1 is reset (in block 50). Next, the read operation mode setting signal is compared with the reference operation mode signal previously stored in the microcomputer 1 on the basis of bits of the two signals (in block 51). If the read bits match the reference bits, the program control outputs a H-voltage level signal (in block 52); if the read bits do not match the reference bits, since this indicates an erroneous operation mode selection, the program control outputs a L-voltage level signal as an abnormal-operation-mode command signal.

Further, in FIG. 4, the base of a transistor 22 is connected to the operation mode terminal $P_A$; and the base of another transistor 24 is connected to the collector of the transistor 22; an alarm lamp 20 is connected to the collector of the transistor 24.

In this embodiment, the second operation mode checking program shown in FIG. 5 is operation mode checking means; the two transistors 22 and 34 and the alarm lamp 20 are abnormal-operation-mode correcting means.

The operation of the second embodiment will be described hereinbelow.

When a power supply for a microcomputer 1 is turned on, the microcomputer 1 is reset or initialized by the reset circuit 10 after a predetermined time period determined by the time constant of $C_1 \times R_1$. When reset, the microcomputer 1 reads an operation mode setting signal corresponding to a desired operation mode, which is generated by an external circuit, into a program control register through the port terminals $P_{01}$, $P_{02}$, and $P_{03}$.

On the other hand, when reset, the microcomputer 1 begins to execute control programs sequentially beginning from the address No. 1 of the control memory.

Additionally, since the second operation mode checking program shown in FIG. 5 is stored in a predetermined address number of the control memory, the bits of the operation mode setting signal are read from the register and compared with the reference ones. If both the bits match, the control program outputs a H-voltage level signal to the transistor 22. Therefore, the transistor 22 is turned on; the transistor 24 is turned off, with the result that the alarm lamp 20 is not lit up, indicating that the operation mode has been selected normally.

In contrast with this, in case noise is generated and inputted to the port terminals $P_{01}$, $P_{02}$, and $P_{03}$ when the microcomputer 1 is initialized and therefore the operation mode setting signal changes from the correct one, since both the bits do not match, the control program outputs a L-voltage level signal to the transistor 22. Therefore, the transistor 22 is turned off; the transistor 24 is turned on, with the result that the alarm lamp 20 comes on indicating that an erroneous operation mode has been selected. In such case as described above, it is possible to select a correct operation mode by resetting the microcomputer again, that is, by turning the power supply of the microcomputer once off and next on again.

Figure 6:
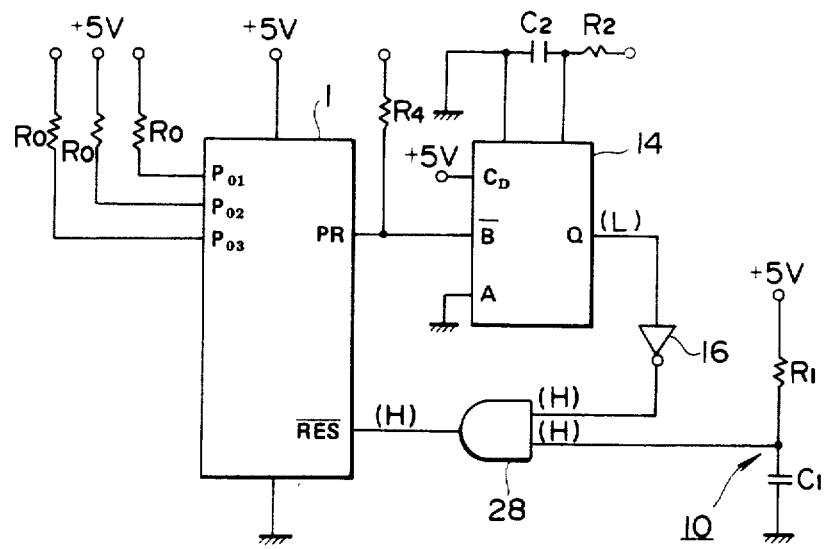
FIG. 6 is a schematic block diagram of a third embodiment of the operation mode monitor for a microcomputer according to the present invention, in which a predetermined operation mode can be checked in accordance with a first operation mode checking program and a microcomputer resetting signal is outputted in response to the WAIT instruction in case an erroneous operation mode has been selected.

FIG. 6 shows a third embodiment of the operation mode monitor for a microcomputer according to the present invention, in which a predetermined operation mode can be checked in accordance with a first operation mode checking program shown in FIG. 3 and the microcomputer is automatically reset so as to select a correct operation mode again in response to the output signal from the retriggerable monostable multivibrator.

Figure 2:
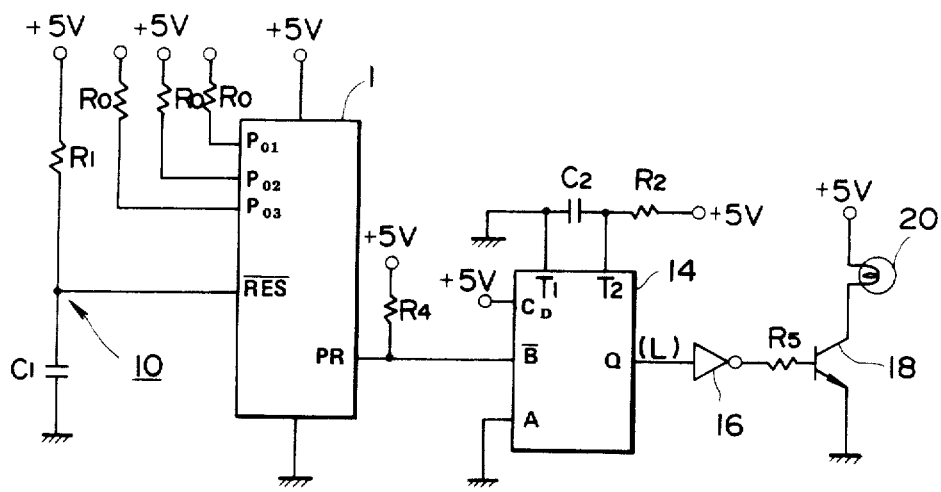
FIG. 2 is a schematic block diagram of a first embodiment of the operation mode monitor for a microcomputer according to the present invention, in which a predetermined operation mode can be checked in accordance with a first operation mode checking program and an alarm lamp comes on in response to an WAIT instruction in case an erroneous operation mode has been selected.

In this embodiment, an AND gate 28 is disposed in order to reset the microcomputer when the first operation mode checking program checks an erroneous operation mode, in place of an alarm lamp 20 and the transistor 18 shown in FIG. 2.

In more detail, the first operation mode checking program shown in FIG. 3 is stored and a retriggerable monostable multivibrator 14 is connected to the program run terminal PR from which a program run signal, the signal level of which is inverted periodically, is outputted. The output terminal Q of the multivibrator 14 is connected one input terminal of an AND gate 28 via an inverter 16 and the output of the reset circuit 10 is connected to the other input terminals of the AND gate 28. Further, the output terminal of the AND gate 28 is connected to the inversion reset terminal $\overline{RES}$ of the microcomputer 1.

In this embodiment, the first operation mode checking program shown in FIG. 3 is operation mode checking means; the retriggerable monostable multivibrator 14 and the AND gate 28 are abnormal-operation-mode correcting means.

The operation of the third embodiment according to the present invention will be described hereinbelow.

When a power supply for a microcomputer 1 is turned on, the voltage is applied to the inversion terminal $\overline{B}$ of the retriggerable monostable multivibrator 14 to trigger it. Therefore, the output terminal Q of the multivibrator 14 is kept at a H-voltage level and then turned to a L-voltage level after a predetermined set time $t_2$. However, since this L-voltage level signal is iverted via the inverter 16, one input terminal of the AND gate 28 is kept at a H-voltage level.

When turned on, since the power supply voltage is simultaneously applied to the reset circuit 10, the voltage of the capacitor $C_1$ rises gradually to a H-voltage level to reset the microcomputer 1.

When reset, the microcomputer 1 reads three bits of the operation mode setting signal corresponding to a desired operation mode, which is generated by an external circuit, into a program control register through the port terminals $P_{01}$, $P_{02}$, and $P_{03}$.

On the other hand, when reset, the microcomputer 1 begins to execute control programs sequentially beginning from the address No. 1 of the control memory and outputs a program run signal inverted periodically with a periodic time $t_1$ from the terminal PR. Additionally, since the first operation mode checking program shown in FIG. 3 is stored in a predetermined address number of the control memory, the three bits of the operation mode setting signal are read from the register and compared with the reference onces. If both the bits match, the control program continues to execute necessary calculations or operations, outputting a program run signal to repeatedly trigger the multivibrator 14 and to keep the output Q thereof at a H-voltage level. Since this output signal is inverted to a L-voltage level by the inverter 16, the output of the AND gate 28 is at a L-voltage level without resetting the microcomputer 1, even if the other input terminal of the AND gate 28 is kept at a H-voltage level.

In contrast with this, in case noise is generated and inputted to the port terminals $P_{01}$, $P_{02}$, and $P_{03}$ when the microcomputer is initialized and thereby the operation mode setting signal changes from the original one, since both the bits do not match, the control program executes an WAIT instruction in block 32 shown in FIG. 3.

Once this WAIT instruction is executed, all the terminals of the microcomputer 1 inclusive of terminal PR are kept at a predetermined voltage level. That is to say, the program run signal outputted from the terminal PR is not inverted over the preset time $t_2$ of the retriggerable monostable multivibrator 14, with the result that the output Q of the multivibrator 14 outputs a L-voltage level signal when the preset time $t_2$ has elapsed. Therefore, after inverted into a H-voltage level signal via the inverter 16, this output signal is applied to one input terminal of the AND gate 28. Since two H-voltage level signals are inputted, the AND gate 28 outputs a H-voltage signal to the inversion reset terminal $\overline{RES}$ to reset the microcomputer. The above-mentioned resetting operation is made repeatedly until a correct operation mode can be selected.

Figure 7:
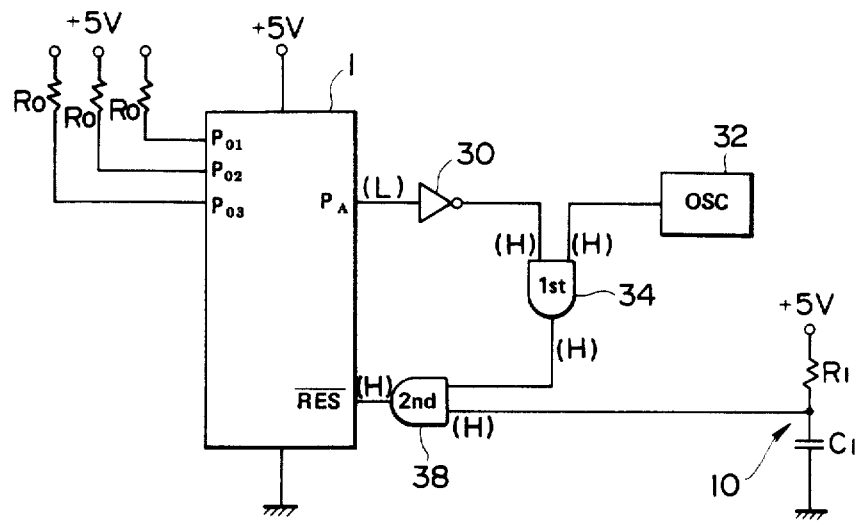
FIG. 7 is a schematic block diagram of a fourth embodiment of the operation mode monitor for a microcomputer according to the present invention, in which a predetermined operation mode can be checked in accordance with the second operation mode checking program and a microcomputer resetting signal is repeatedly outputted in response to a L-voltage level signal in case an erroneous operation mode has been selected.

FIG. 7 shows a fourth embodiment of the operation mode monitor for a microcomputer according to the present invention, in which a predetermined operation mode can be checked in accordance with the second operation mode checking program and the microcomputer is automatically reset to a correct operation mode in response to an ANDed signal of an abnormal-operation-mode command signal outputted from the terminal $P_A$ and an oscillation signal outputted from an oscillator.

In this embodiment, two AND gates 34 and 38 and an oscillator 32 are disposed in order to reset the microcomputer when the second operation mode checking program checks an erroneous operation mode, in place of an alarm lamp 20 and the transistors 22 and 24 shown in FIG. 4.

In FIg. 7, the abnormal-operation-mode output terminal $P_A$ is connected to one input terminal of a first AND gate 34; the output of an oscillator 32 is connected to the other input terminal of the first AND gate 34. The output of the first AND gate 34 is connected to the one input terminal of a second AND gate 38; the output of the reset circuit 10 made up of a resistor $R_1$ and a capacitor $C_1$ is connected to the other input terminal of the second AND gate 38. Further, the output of the second AND gate 38 is connected to the inversion reset terminal $\overline{RES}$ of the microcomputer 1.

In this embodiment, the second operation mode checking program shown in FIG. 5 is operation mode checking means; the two AND gates 34 and 38 and the oscillator 32 are abnormal-operation-mode correcting means.

The operation of the fourth embodiment according to the present invention will be described hereinbelow.

When a power supply for a microcomputer 1 is turned on, since the microcomputer 1 is not yet in operation, the abnormal-operation-mode outputting terminal $P_A$ is at a L-voltage level. This L-voltage level is inverted to a H-voltage level through the inverter 30. On the other hand, the oscillator 32 is immediately activated outputting a H-voltage level signal, with the result that a H-voltage level signal is outputted from the first AND gate 34 to change one input terminal of the second AND gate 38 at a H-voltage level.

When the power supply for the microcomputer 1 is turned on, since the voltage is simultaneously applied to the reset circuit 10, the other input terminal of the second AND gate 38 changes to a H-voltage level a predetermined time period (determined by a time constant of $C_1 \times R_1$) after the power supply has been turned on. As a result, the output of the first AND gate 38 becomes a H-voltage level to reset the microcomputer 1.

When reset, the microcomputer 1 reads three bits of the operation mode setting signal corresponding to a desired operation mode, which is generated by an external circuit, into the program control register through the port terminals $P_{01}$, $P_{02}$, and $P_{03}$.

On the other hand, when reset, the microcomputer 1 begins to execute control programs sequentially beginning from the address No. 1 of the control memory. Additionally, since the second operation mode checking program shown in FIG. 5 is stored in a predetermined address number of the control memory, the three bits of the operation mode setting signal are read and compared with the reference ones. If both the bits match, the control program outputs a H-voltage level signal to the inverter 30. Therefore, one input terminal of the first AND gate 34 is kept at a L-voltage level, with the result that the output of the first AND gate 34 is kept at a L-voltage level, without passing an oscillation signal from the oscillator 32. Accordingly, in spite of the fact that the reset circuit 10 is left outputting a H-voltage level signal to the other input terminal of the second AND gate 38, the second AND gate 38 outputs a L-voltage level signal without resetting the microcomputer 1.

In contrast with this, in case noise is generated and inputted to the port terminals $P_{01}$, $P_{02}$, and $P_{03}$ when the microcomputer is reset or initialized and therefore the operation mode setting signal changes from the correct one, since both the bits do not match, the control program outputs a L-voltage level signal to the inverter 30. Therefore, one input terminal of the first AND gate 34 is kept at a H-voltage level, with the result that the output of the first AND gate 34 changes to a H-voltage level whenever the oscillation signal from the oscillator 32 changes to a H-voltage level. In other words, the oscillation signal is passed to one input terminal of the second AND gate 38. Since the reset circuit 10 is left at a H-voltage level, the second AND gate 38 outputs a H-voltage level signal to the inversion reset terminal $\overline{RES}$ to reset the microcomputer 1. The above-mentioned resetting operation is repeated whenever the oscillation signal changes to a H-voltage level, until a correct operation can be selected.

Figure 8:
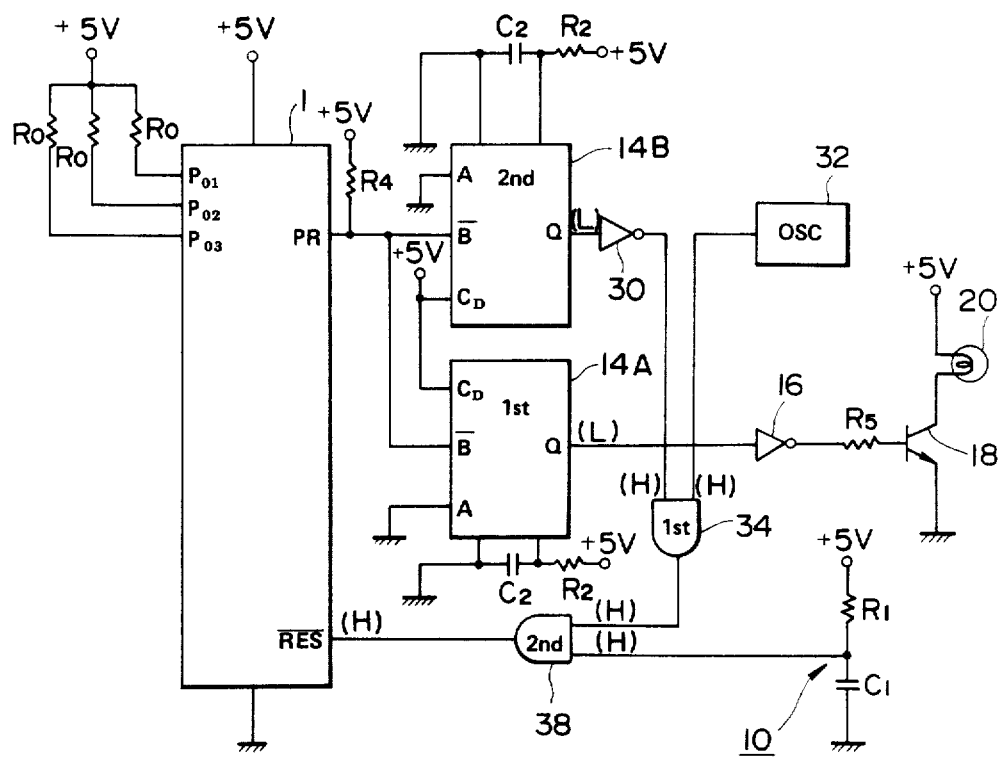
FIG. 8 is a schematic block diagram of a fifth embodiment of the operation mode monitor for a microcomputer according to the present invention, in which a predetermined operation mode can be checked in accordance with the first operation mode checking program and an alarm lamp comes on in response to an WAIT instruction and further a microcomputer resetting signal is repeatedly outputted in response to the WAIT instruction in case an erroneous operation mode has been selected.

FIG. 8 shows a fifth embodiment of the operation mode monitor for a microcomputer according to the present invention, in which a predetermined operation mode can be checked in accordance with the first operation mode checking program and an erroneous operation mode is indicated by an alarm lamp lit up by a first retriggerable monostable multivibrator in response to an abnormal program run signal outputted from a program run terminal and further the microcomputer is automatically reset to a correct operation mode in response to an ANDed signal of the output signal from a second retriggerable monostable multivibrator and an oscillation signal from an oscillator. In other words, this fifth embodiment can be constructed in combination of the first (FIG. 2), the third (FIG. 6) and the fourth (FIG. 7) embodiments.

In this embodiment, the second operation mode checking program shown in FIG. 5 is operation mode checking means; the two retriggerable monostable multivibrators 14A and 14B, the two AND gates 34 and 38, the oscillator 32, the inverters 16 and 30, the transistor 18, and the alarm lamp 20 are abnormal-operation-mode correcting means.

The operation of the fifth embodiment according to the present invention will be described hereinbelow.

When a power supply for a microcomputer 1 is turned on, the voltage is applied to the inversion terminal $\overline{B}$ of a first and a second retriggerable monostable multivibrators 14A and 14B to trigger them. Therefore, the output terminals Q of the multivibrators 14A and 14B are kept at a H-voltage level and then turned to a L-voltage level after a predetermined set time $t_2$. The L-voltage level signal from the second retriggerable monostable multivibrator 14B is inverted to a H-voltage level signal through the inverter 30. On the other hand, the oscillator 32 is immediately activated outputting a H-voltage level signal, with the result that a H-voltage level signal is outputted from the first AND gate 34 to change one input terminal of the second AND gate 38 to a H-voltage level.

When the power supply for the microcomputer 1 is turned on, since the voltage is simultaneously applied to the reset circuit 10, the other input terminal of the second AND gate 38 changes to a H-voltage level a predetermined time period after the power supply has been turned on. As a result, the output of the second AND gate 38 becomes a H-voltage level to reset the microcomputer 1.

When reset, the microcomputer 1 reads the three bits of the operation mode setting signal corresponding to a desired operation mode into the program control register through the port terminals $P_{01}$, $P_{02}$ and $P_{03}$. On the other hand, when reset, the microcomputer 1 begins to execute control programs sequentially beginning from the address No. 1 of the control memory and outputs a program run signal inverted periodically with a periodic time $t_1$ from the terminal PR. Additionally since the first operation mode checking program shown in FIG. 3 is stored in a predetermined address number of the control memory, the three bits of the operation mode setting signal are read from the register and compared with the reference ones. If both the bits match, the control program continues to execute necessary calculations or operations, outputting a program run signal to repeatedly trigger the two multivibrators 14A and 14B, that is, to keep the two outputs Q thereof at a H-voltage level. Since this output signal from the first multivibrator 14A is inverted to a L-voltage level by the inverter 16, the transistor 18 is turned off and therefore the alarm lamp 20 is not lit up.

On the other hand, since this output signal from the second multivibrator 14B is inverted to a L-voltage level by the inverter 30, one input terminal of the first AND gate 34 is kept at a L-voltage level, with the result that the output of the first AND gate 34 is kept at a L-voltage level, without outputting an oscillation signal from the oscillator 32. Accordingly, in spite of the fact that, the reset circuit 10 is left outputting a H-voltage level signal to the other input terminal of the second AND gate 38, the second AND gate 38 outputs a L-voltage level signal without resetting the microcomputer 1.

In contrast with this, in case noise is generated and inputted to the port terminals $P_{01}$, $P_{02}$ and $P_{03}$ when the microcomputer 1 is reset or initialized and thereby the operation mode setting signal changes from the correct one, since both the bits do not match, the first checking program executes an WAIT instruction in block 32 shown in FIG. 3. Once this WAIT instruction is executed, all the terminals of the microcomputer 1 inclusive of the terminal PR are kept at a predetermined voltage level. That is to say, the program run signal outputted from the terminal PR is not inverted over the set time $t_2$ of the retriggerable monostable multivibrators 14A and 14B, with the result that the outputs Q of the multivibrators 14A and 14B output a L-voltage level signal when the set time $t_2$ (multivibrator's inversion set period) has elapsed. In response to this L-voltage level signal, the transistor 18 is turned on after the L-voltage level signal has been inverted by the inverter 16 to light up the alarm lamp 20, indicating that an erroneous operation mode has been selected. On the other hand, the L-voltage level signal from the second multivibrator 14B is applied to the inverter 30. Therefore, one input terminal of the first AND gate 34 is kept at a H-voltage level, with the result that the output of the first AND gate 34 changes to a H-voltage level whenever the oscillation signal from the oscillator 32 changes to a H-voltage level. In other words, the oscillation signal is passed to one input terminal of the second AND gate 38. Since the reset circuit 10 is left outputting a H-voltage level signal to the other input terminal of the second AND gate 38, the second AND gate 38 outputs a H-voltage level signal to the inversion reset terminal $\overline{RES}$ to reset the microcomputer 1. The above-mentioned resetting operation is repeated whenever the oscillation signal changes to a H-voltage level until a correct operation can be selected.

In brief summary, in this fifth embodiment, a correct operation mode can be selected repeatedly by resetting the microcomputer and an alarm lamp comes on when an abnormal operation mode is being selected.

Figure 9:
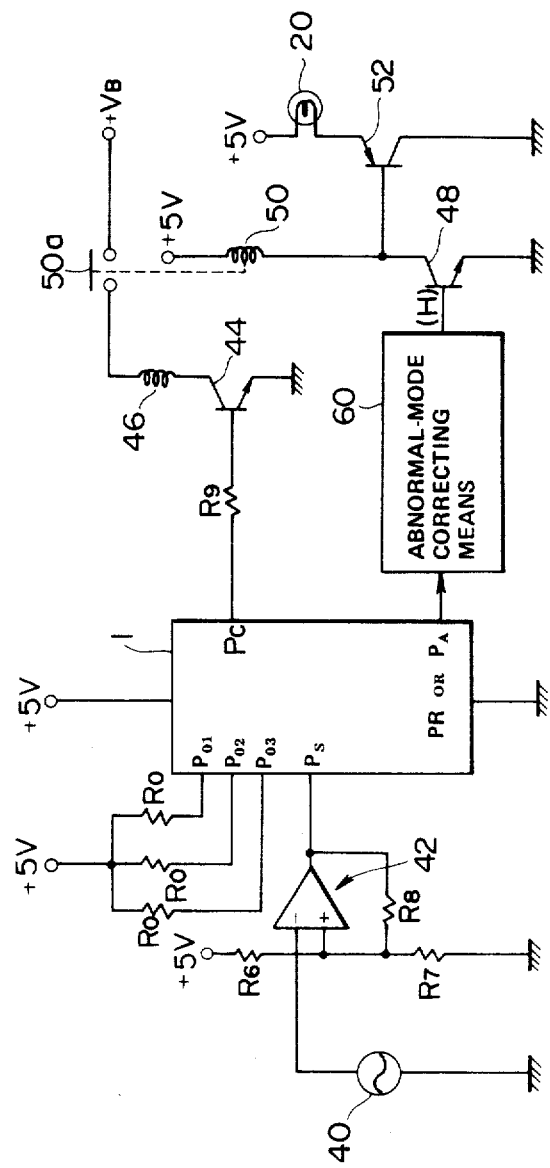
FIG. 9 is a schematic block diagram of a sixth embodiment of the operation mode monitor for a microcomputer according to the present invention, in which an anti-skid control system for an automotive vehicle is given as an example of disabling an actuator controlled by the microcomputer in case an erroneous operation mode has been selected.

FIG. 9 shows a sixth embodiment of the operation mode monitor for a microcomputer according to the present invention, in which an anti-skid control system for an automotive vehicle is automatically disabled into an ordinary brake operation in case an erroneous operation mode has been selected within the microcomputer.

The anti-skid control system serves to prevent an automotive vehicle from slipping sideways on the road without rotating a wheel, while the vehicle moves onward. When an emergency brake is applied to an automotive vehicle and thereby the rear wheels are locked, the vehicle tends to skid. Therefore, the skid is prevented by reducing the hydraulic pressure of brake fluid immediately before the wheels are locked. However, if the hydraulic pressure is left reduced, no brake force is applied to the vehicle even if the brake pedal is fully depressed. The anti-skid control system can control the hydraulic pressure of the brake fluid so as to obtain an appropriate brake function without slipping the vehicle sideways by repeatedly increasing or reducing the hydraulic pressure according to the revolution speed of vehicle wheels.

In FIG. 9, the reference numeral 40 denotes a wheel speed sensor for outputting an alternating sensor signal the frequency of which is proportional to the revolution speed of vehicle's wheels.

The reference numeral 42 denotes an operational amplifier. The output signal from the wheel speed sensor 40 is applied to one input terminal (−) of the operational amplifier 42; a voltage obtained by dividing the supply voltage of 5 volt with two resistors $R_6$ and $R_7$ is applied to the other input terminal (+) of the operational amplifier 42. Further, a resistor $R_8$ serves as a feedback circuit. Therefore, the alternating signal indicative of wheel speed is converted into a rectangular pulse signal through the operational amplifier 42 and is inputted to the microcomputer 1 through the port terminal $P_5$.

Since there is provided an anti-skid control program within the microcomputer 1, the microcomputer 1 calculates an appropriate frequency of brake operation and outputs a control signal to activate an actuator; that is, an optimum brake pumping operation (brake is applied or released repeatedly) can be obtained on the basis of the signal detected by the wheel speed sensor 40 and amplified through the operational amplifier 42.

The control signal from the microcomputer 1 is applied to the base of a power transistor 44 via a resistor $R_9$. Therefore, when the control signal is at a H-voltage level, the power transistor 44 is turned on to energize an electromagnetic solenoid (hydraulic pressure actuator), so that the hydraulic pressure of the brake system is reduced for prevention of skid. On the other hand, when the control signal is at a L-voltage level, the power transistor 44 is turned off to deenergize the electromagnetic solenoid 46, so that the hydraulic pressure of the brake system is increased for application of brake to the vehicle.

In such an anti-skid control system as described above, in case an erroneous operation mode has been selected, a signal indicative of erroneous operation mode selection is outputted through the program run terminal or an abnormal-operation-mode output terminal $P_4$ and applied to an abnormal-operation-mode correcting means 60 such as a retriggerable monostable multivibrator 14 shown in FIGS. 2, 6, or 8.

In this embodiment, the signal from the abnormal-operation-mode correcting means 60 is applied to the base of a transistor 48, to the collector of which a relay 50 is connected for cutting off the power supply from the transistor 44. Therefore, when the signal from the abnormal-operation-mode correcting means 60 is at a H-voltage level, the power transistor 48 is turned on to energize the solenoid 50, so that a relay contact 50a is opened so as to disable the control of the transistor 44, that is, the electromagnetic solenoid 46 provided for the anti-skid control system as an actuator is disabled.

Further, another transistor 52 is connected to the transistor 48 to light up an alarm lamp 20 in response to a H-voltage level signal from the abnormal-operation-mode correcting means 60.

The operation of this sixth embodiment according to the present invention will be described hereinbelow.

In case an erroneous operation mode has been selected in the microcomputer 1, the abnormal-operation-mode correcting means 60 outputs a H-voltage level signal to turn on the transistor 48, so that the relay 50 is energized to open the relay contact 50a. Therefore, the power supply is cut off from the electromagnetic solenoid 46 to disable the function of the actuator of the anti-skid control system, with the result that the brake control system functions as an ordinary brake operation. In other words, a fail-safe operation can be attained in the anti-skid control system.

Further, in this embodiment, since the transistor 52 is also turned on when the transistor 48 is on, the alarm lamp 20 comes on indicating that an abnormal operation mode has been selected.

When this lamp 20 comes on, it is possible to select a correct operation mode by resetting the microcomputer again; that is, by turning the power supply of the microcomputer once off and next on again.

Further, in this embodiment, in the case where the program run signal is outputted from the microcomputer 1 to the abnormal-operation-mode correcting means 60 through the terminal PR, it is possible to use a conventional watchdog timer in place of the retriggerable monostable multivibrator 14 or 14A as shown in FIGS. 2 and 6.

An anti-skid control system has been explained hereinabove by way of example. However, without being limited to this system, it is possible to apply this sixth embodiment according to the present invention to other systems such as an engine control system, an airconditioner control system, etc. of an automotive vehicle.

Further, it is possible to apply the present invention to any control systems using a microcomputer in which any one of a plurality of operation modes can be selected in response to an operation mode setting signal generated from an external circuit, in order to disable the control system in case of an erroneous operation mode selection.

As described above, in the operation mode monitor according to the present invention for a microcomputer in which any one of a plurality of operation modes can be selected in response to an operation mode setting signal generated from an external circuit, since the predetermined operation mode is checked with a specific program stored within the microcomputer and an abnormal-operation-mode signal can be outputted from the microcomputer in case an erroneous operation mode has been selected, even if external noise is mixed with the operation mode setting signal and therefore an erroneous operation mode has been selected, it is possible to indicate an erroneous operation mode selection and further to set the microcomputer to a correct operation mode again by automatically re-resetting it, thus preventing abnormal program control due to erroneous operation mode selection.

Further, in case of an erroneous operation mode selection, since an actuator controlled by the microcomputer is disabled in response to an abnormal-operation-mode signal, it is possible to prevent abnormal program control due to erroneous operation mode selection.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. An operation mode monitor for a microcomputer in which any one of a plurality of operation modes can be selected in response to an operation mode setting signal generated from an external circuit whenever the microcomputer is initialized by an external reset circuit, which comprises:
   (a) operation mode checking means for checking whether a correct operation mode has been selected in the microcomputer and for outputting an abnormal-operation-mode command signal in case an erroneous operation mode has been selected; and
   (b) abnormal-operation-mode correcting means responsive to said operation mode checking means for correcting an erroneously-selected operation mode to a correct operation mode in response to the abnormal-operation-mode command signal.

2. An operation mode monitor for a microcomputer as set forth in claim 1, wherein said operation mode checking means is the microcomputer itself for storing the bits of the operation mode setting signal generated from the external circuit to a program control register provided therein when the microcomputer is initialized in response to a reset signal outputted from the external reset circuit, reading the stored bits of the operation mode setting signal and the previously-stored reference bits corresponding thereto, comparing the stored bits and the reference bits, and outputting an abnormal-operation-mode command signal when the stored bits do not match the reference bits.

3. An operation mode monitor for a microcomputer as set forth in claim 1, wherein said abnormal-operation-mode correcting means is means for lighting-up an alarm lamp indicative of an erroneous operation mode selection in response to the abnormal-operation-mode command signal outputted from said operation mode checking means.

4. An operation mode monitor for a microcomputer as set forth in claim 1, wherein said abnormal-operation-mode correcting means is means for initializing the microcomputer in response to the abnormal-operation-mode command signal outputted from said operation mode checking means.

5. An operation mode monitor for a microcomputer as set forth in claim 1, wherein said abnormal-operation-mode correcting means further comprises means for disabling program control executed by the microcomputer in response to the abnormal-operation-mode command signal outputted from said abnormal-operation-mode checking means.

6. An operation mode monitor for a microcomputer as set forth in claim 3, wherein said means for lighting-up an alarm lamp indicative of an erroneous operation mode selection comprises:
   (a) a retriggerable monostable multivibrator connected to said operation mode checking means for outputting an alarm signal in response to an abnormal-operation-mode command signal;
   (b) a transistor connected to said retriggerable monostable multivibrator and turned on in response to the alarm signal; and
   (c) an alarm lamp connected to said transistor and lit up when said transistor is turned on in response to the alarm signal for indicating that an erroneous operation mode has been selected in the microcomputer.

7. An operation mode monitor for a microcomputer as set forth in claim 4, wherein said means for initializing the microcomputer comprises:
   (a) a retriggerable monostable multivibrator connected to said operation mode checking means for outputting a reset signal in response to an abnormal-operation-mode command signal;
   (b) an AND gate connected to said retriggerable monostable multivibrator and the external reset circuit for outputting a reset signal to the microcomputer for its initialization when the external reset circuit outputs a reset signal and when said retriggerable monostable multivibrator outputs a reset signal.

8. An operation mode monitor for a microcomputer as set forth in claim 4, wherein said means for initializing the microcomputer comprises:
   (a) an oscillator for outputting an oscillating signal:
   (b) a first AND gate connected to said operation mode checking means and said oscillator for outputting an ANDed signal of the abnormal-operation-mode command signal and the oscillation signal; and
   (c) a second AND gate connected to said first AND gate and the external reset circuit for outputting a reset signal to the microcomputer for its initialization when the external reset circuit outputs a reset signal and when said first AND gate outputs the ANDed signal.

9. An operation mode monitor for a microcomputer as set forth in claim 4, wherein said means for initializing the microcomputer comprises:
   (a) a retriggerable monostable multivibrator connected to said operation mode checking means for outputting a reset signal in response to an abnormal-operation-mode command signal;
   (b) an oscillator for ouputting an oscillating signal;
   (c) a first AND gate connected to said retriggerable monostable multivibrator and said oscillator for outputting a fist ANDed signal of the reset signal and the oscillation signal; and
   (d) a second AND gate connected to said first AND gate and the external reset circuit for outputting a reset signal to the microcomputer for its initialization when the external reset circuit outputs a reset signal and when said first AND gate outputs the first ANDed signal.

10. An operation mode monitor for a microcomputer as set forth in claim 5, wherein said means for disabling program control comprises:
   (a) a transistor connected to said operation mode correcting means and turned on in response to theabnormal-operation-mode command signal; and
   (b) a relay connected to said transistor and erergized, when said transistor is turned on, for cutting off a power supply from an actuator provided for a system controlled by the microcomputer.

11. A method of monitoring that any one of a plurality of operation modes has correctly been selected in a microcomputer in response to an operation mode setting signal generated from an external circuit whenever the microcomputer is initialized by an external reset circuit, which comprises the following steps of:
  (a) storing the bits of the operation mode setting signal generated from the external circuit to program control resistor provided in the microcomputer when the microcomputer is initialized;
  (b) reading the stored bits of the operation mode setting signal and the previously-stored reference bits corresponding thereto;
  (c) comparing the stored bits and the reference bits;
  (d) if the stored bits match the reference bits, continuing the succeeding program control; and
  (e) if the stored bits do not match the reference bits, outputting an abnormal-operation-mode command signal from the microcomputer to light-up an alarm lamp for indicating that an erroneous operation mode has been selected.

12. A method of monitoring that any one of a plurality of operation modes has correctly been selected in a microcomputer as set forth in claim 11 wherein the abnormal-operation-mode command signal is a WAIT instruction command signal for holding a program run signal at a fixed level.

13. A method of monitoring that any one of a plurality of operation modes has correctly been selected in a microcomputer as set forth in claim 11 wherein the abnormal-operation-mode command signal is any one of a H-voltage level signal and a L-voltage level signal.

14. A method of monitoring that any one of a plurality of operation modes has correctly been selected in a microcomputer in response to an operation mode setting signal generated from an external circuit whenever the microcomputer is initialized by an external reset circuit, which comprises the following steps of:
  (a) storing the bits of the operation mode setting signal generated from the external circuit to a program control resistor provided in the microcomputer when the microcomputer is initialized;
  (b) reading the stored bits of the operation mode setting signal and the previously-stored reference bits corresponding thereto;
  (c) comparing the stored bits and the reference bits;
  (d) if the stored bits match the reference bits, continuing the succeeding program control; and
  (e) if the stored bits do not match the reference bits, outputting an abnormal-operation-mode command signal from the microcomputer to initialize the microcomputer repeatedly.

15. A method of monitoring that any one of a plurality of operation modes has correctly been selected in a microcomputer as set forth in claim 14, wherein the abnormal-operation-mode command signal is a WAIT instruction command signal for holding a program run signal at a fixed level.

16. A method of monitoring that any one of a plurality of operation modes has correctly been selected in a microcomputer as set forth in claim 14, wherein the abnormal-operation-mode command signal is any one of a H-voltage level signal and a L-voltage level signal.

17. A method of monitoring that any one of a plurality of operation modes has correctly been selected in a microcomputer in response to an operation mode setting signal generated from an external circuit whenever the microcomputer is initialized by an external reset condition, which comprises the following steps of:
  (a) storing the bits of the operation mode setting signal generated from the external circuit to a program control resistor provided in the microcomputer when the microcomputer is initialized;
  (b) reading the stored bits of the operation mode setting signal and the previously-stored reference bits corresponding thereto;
  (c) comparing the stored bits and the reference bits;
  (d) if the stored bits match the reference bits, continuing the succeeding program control; and
  (e) if the stored bits do not match the reference bits, outputting an abnormal-operation-mode command signal from the microcomputer to disable program control executed by the microcomputer.

18. A method of monitoring that any one of a plurality of operation modes has correctly been selected in a microcomputer as set forth in claim 17, wherein the abnormal-operation-mode command signal is a WAIT instruction command signal for holding a program run signal at a fixed level.

19. A method of monitoring that any one of a plurality of operation modes has correctly been selected in a microcomputer as set forth in claim 17, wherein the abnormal-operation-mode command signal is any one of a H-voltage level signal and a L-voltage level signal.

* * * * *